(12) United States Patent
Oberacker (10) Patent No.: US 10,753,288 B2
(45) Date of Patent: Aug. 25, 2020

(54) THROTTLE VALVE HOUSING FOR A THROTTLE VALVE ARRANGEMENT FOR AN INTERNAL COMBUSTION ENGINE

(71) Applicant: FISCHER ROHRTECHNIK GMBH, Achern-Fautenbach (DE)

(72) Inventor: Dieter Oberacker, Waghäusel (DE)

(73) Assignee: FISCHER ROHRTECHNIK GMBH, Achern-Fautenbach (DE)

( * ) Notice: Subject to any disclaimer, the term of this patent is extended or adjusted under 35 U.S.C. 154(b) by 0 days.

(21) Appl. No.: 16/310,018

(22) PCT Filed: Jun. 14, 2017

(86) PCT No.: PCT/EP2017/064585
§ 371 (c)(1),
(2) Date: Dec. 14, 2018

(87) PCT Pub. No.: WO2017/216246
PCT Pub. Date: Dec. 21, 2017

(65) Prior Publication Data
US 2019/0292999 A1    Sep. 26, 2019

(30) Foreign Application Priority Data

Jun. 15, 2016 (DE) .................. 10 2016 110 998
Dec. 16, 2016 (EP) ..................................... 16204900

(51) Int. Cl.
*F02D 9/08* (2006.01)
*F02D 9/10* (2006.01)
(Continued)

(52) U.S. Cl.
CPC ........... *F02D 9/1045* (2013.01); *F02D 9/107* (2013.01); *F02D 9/1035* (2013.01); *F02D 9/106* (2013.01);
(Continued)

(58) Field of Classification Search
CPC ...... F02D 9/1045; F02D 9/1035; F02D 9/107; F02D 9/1085; F02D 9/106; F16K 27/0218; F16K 1/224
(Continued)

(56) References Cited

U.S. PATENT DOCUMENTS 5,669,350 A * 9/1997 Altmann .................... F02D 9/10
                                                            123/337
6,981,519 B2 * 1/2006 Heckt ....................... F02D 9/06
                                                            123/323
(Continued)

FOREIGN PATENT DOCUMENTS

DE         8120908 U1    10/1981
DE         4329526 A1     3/1995
(Continued)

*Primary Examiner* — Hai H Huynh
(74) *Attorney, Agent, or Firm* — David S. Safran; Roberts Calderon Safran & Cole, P.C.

(57) ABSTRACT

A throttle valve housing (1) for a throttle valve arrangement for an internal combustion engine, wherein the throttle valve housing (1) is used to accommodate a pivotally mounted throttle valve and provides movement space for the throttle valve, wherein the throttle valve housing (1) has an inflow opening (2) on a first side for receiving a fluid and the throttle valve housing (1) has an outflow opening (3) on a second side for discharging a fluid, and wherein at least one sealing piece (4) projecting into the flow cross-section is arranged in the movement space of the throttle valve housing (1) and is used as a stop for the throttle valve in the closed position. Improved sealing characteristics are achieved in that the sealing piece (4) is formed in the wall of the throttle valve housing (1) in a non-cutting manner.

9 Claims, 6 Drawing Sheets

(51) Int. Cl.
*F16K 1/22* (2006.01)
*F16K 27/02* (2006.01)

(52) U.S. Cl.
CPC ............ *F02D 9/1085* (2013.01); *F16K 1/224* (2013.01); *F16K 27/0218* (2013.01)

(58) Field of Classification Search
USPC .......................................... 123/337; 251/305
See application file for complete search history.

(56) References Cited

U.S. PATENT DOCUMENTS

| | | | | |
|---|---|---|---|---|
| 7,546,828 B2 * | 6/2009 | Kuhnel | ............... | B29C 45/0017 |
| | | | | 123/305 |
| 7,716,828 B2 * | 5/2010 | Miyauchi | ............ | B29C 45/1671 |
| | | | | 123/337 |
| 10,234,040 B2 * | 3/2019 | Al-Khoury | ............ | F16K 1/2265 |

FOREIGN PATENT DOCUMENTS

| | | |
|---|---|---|
| DE | 4408909 A1 | 9/1995 |
| DE | 102005028397 A1 | 12/2006 |
| GB | 2079901 A | 1/1982 |

\* cited by examiner

THROTTLE VALVE HOUSING FOR A THROTTLE VALVE ARRANGEMENT FOR AN INTERNAL COMBUSTION ENGINE

BACKGROUND OF THE INVENTION

Field of the Invention

The present invention relates to a throttle valve housing for a throttle valve arrangement for an internal combustion engine, wherein the throttle valve housing is used to accommodate a pivotally mounted throttle valve and provides movement space for the throttle valve, wherein the throttle valve housing has an inflow opening on a first side for receiving a fluid and the throttle valve housing has an outflow opening on a second side for discharging a fluid, and wherein at least one sealing piece projecting into the flow cross-section is arranged in the movement space of the throttle valve housing and is used as a stop for the throttle valve in the closed position. In addition, the invention also relates to a method for manufacturing such a throttle valve housing.

Description of Related Art

Throttle valve arrangements for combustion engines have long been known. Such throttle valve arrangements are provided in the supply air duct of an internal combustion engine in order to be able to control the amount of air flowing into the engine so that the fuel-to-air ratio can be adjusted to influence the output power of gasoline engines. In diesel engines, throttle valve arrangements in the supply air duct have a different meaning, namely with regard to setting the recirculation rate of exhaust gases. In the exhaust tract of combustion engines, throttle valve arrangements are frequently used to influence noise emissions and to influence the dynamic pressure in the exhaust tract. Due to the thermal load, throttle valve arrangements are usually made of metal.

What the throttle valve arrangements have in common is that pivoting the throttle valve in the throttle valve body influences the flow cross-section and thus the flow resistance between the inflow opening and the outflow opening. The inflow opening is used to introduce a fluid—usually fresh air, exhaust gas or a mixture of both—into the throttle valve housing. Accordingly, the fluid escapes from the throttle valve housing via the outflow opening. The flow path between the inflow opening and the outflow opening is influenced by the throttle valve.

It is obvious that a quality feature of throttle valve arrangements is the degree of sealing achieved in the closed position of the throttle valve. In the production of throttle valve arrangements, this degree of sealing must, of course, be reproducible with high accuracy in order to achieve consistent quality.

State-of-the-art throttle valve arrangements are often known in which the throttle valve housing is completely uncontoured, i.e., smooth, even in the area of the movement space of the throttle valve, so that the throttle valve forms a sealing gap with the throttle valve housing in the closed position, which is visible when viewed in the direction of flow, i.e., looking from the inflow opening through the valve housing to the outflow opening. The throttle is then practically perpendicular to the wall of the throttle valve housing. It is also known that additional material—for example, in the form of a sheet metal formed on the wall of the throttle valve housing—is placed in the movement space of the throttle valve housing, i.e., on the wall of the throttle valve housing, so that a stop is created for the throttle valve housing in its closed position. This is easy, for example, if the throttle valve housing is a circular tube into which a slightly smaller tube or half tube or tube segments are simply inserted as a stop. This is relatively expensive, on the one hand, because additional structural elements have to be inserted into the cramped dimensions of the throttle valve housing and be precisely positioned there, and on the other hand because a further process step has to be carried out to attach these structural elements. When throttle valve housings and the additional sealing elements are joined together, the question also arises as to whether a reliable seal can be achieved (problem of gap formation).

SUMMARY OF THE INVENTION

The object of the present invention is to provide a throttle valve housing with improved sealing properties and a corresponding method for manufacturing such a throttle valve housing.

In the throttle valve housing described above, the described and derived object is initially and essentially achieved in that the sealing piece is formed in the wall of the throttle valve housing in a non-cutting manner. Due to the non-cutting forming of the sealing piece in the wall of the throttle valve housing, it is clear that the sealing piece is manufactured with the material of the wall and that no additional elements are incorporated into the throttle valve housing to implement the sealing piece. Such a throttle valve housing can be produced by non-cutting forming processes, e.g., by using high-pressure forming or by pressing the wall material of the throttle valve housing into a correspondingly contoured counter form with a rigid punch (die to die forming).

Such a throttle valve housing is also particularly advantageous because not only simple geometries of the throttle valve movement space and simple throttle valve geometries can be implemented, but practically any contours can be implemented.

It is particularly advantageous when the throttle valve housing and the sealing piece of the throttle valve housing are made of a single piece of tube by non-cutting forming. Non-round throttle valve housings can also be made from round tubes, especially in the area of the movement space of the throttle valve housing.

In an advantageous further development of the throttle valve housing, it is provided that the sealing piece is formed in the movement space everywhere where the throttle valve housing closes with the throttle valve housing only in the closing position. The sealing piece does not have to be a completely closed circumferential sealing contour; rather, the sealing piece is only formed where it can develop a corresponding sealing and stop effect in relation to the throttle valve. For example, the throttle valve may be mounted on a shaft which runs centrally through the flow cross-section of the movement space of the throttle valve housing. When the throttle valve is pivoted with such a shaft, a part of the throttle valve inevitably moves against the direction of flow and the other part of the throttle valve moves in the direction of flow. At the location of the shaft itself, the throttle valve is practically not moved, at least not in the sense of releasing and closing a flow cross-section. As a result, the sealing piece does not have to be provided in the shaft area. This example shows that the sealing piece can be formed by several sealing piece segments that are formed along the sealing contour in and with the throttle valve housing.

In another preferred design, it is provided that the sealing piece has a triangular profile with a flow edge, a sealing edge and a tip, wherein the flow edge and the sealing edge each originate from a base level of the throttle valve housing with a base point and converge in the tip. The tip protrudes furthest into the flow cross-section. The sealing edge is formed on the side of the sealing piece on which the throttle valve strikes in the closing position. The flow edge is therefore arranged on the other side, i.e., opposite the sealing edge. Such a geometry of the sealing piece is particularly easy to produce and also gentle to the material.

By forming the wall of the throttle valve housing without cutting, a material flow can practically always be achieved which can put considerable strain on the formed material. The stress is greatest at the point where the greatest internal material displacement is caused, since the structure of the material is changed most. With a triangular design of the sealing piece, it is possible to achieve a sealing structure with comparatively smooth contours. The triangular profile also has aerodynamic advantages, since the fluid flow through the throttle valve housing is guided continuously and without offset through the edges of the sealing piece, so that the influence of the sealing piece is relatively small in aerodynamic terms.

It is particularly preferred that a smooth sealing region is formed in the sealing edge between its base point and the tip. In the case of a tubular throttle valve housing, this practically creates a circumferential sealing surface which forms a sealing ring looking in or opposite to the direction of flow towards the sealing edge. This is advantageous because it is particularly easy to form the parts of the throttle valve which, in the closing position of the throttle valve, are opposite the smooth sealing region of the sealing edge.

A particularly advantageous design of the throttle valve housing is characterized in that the triangular profile of the sealing piece is asymmetrical, with the sealing edge being steeper than the flow edge. It has proved to be advantageous to have the sealing edge run relatively steeply, i.e., with a very large gradient into the flow cross-section. One reason for this is that the sealing edge is then only very slightly inclined with respect to the flow cross-section and thus with respect to the throttle valve in the closed position, which is then usually positioned in the flow cross-section, i.e., perpendicular to the direction of flow.

If the throttle valve is not only to be in circumferential contact with the sealing edge of the sealing piece with a narrow edge on its outer edge, but if better sealing is to be achieved, then the throttle valve should be in flat contact with the sealing edge of the sealing piece in the closing position, so that a circumferential sealing surface is achieved. In this area, the throttle valve must therefore form an appropriately formed counterpart to the sealing edge. The steeper the sealing edge protrudes into the flow cross-section, the less the throttle valve has to be tapered in its sealing edge area—deviating from the pure shape of a flat disc. The disadvantage of the steep course of the sealing edge into the flow cross-section is that the material load caused by non-cutting forming, for example, by internal high-pressure forming, is very high in this area, since relatively large deformation must be achieved with little material.

Due to the asymmetrical design of the sealing piece mentioned above, the flow edge is flatter than the sealing edge, which means that considerably more material is available for the wall of the throttle valve housing than for the sealing edge in order to form the flow edge from its base point to the tip.

The asymmetrical design of the triangular sealing piece profile means that a relatively large proportion of the area of the sealing piece—i.e., in the area of the flow edge—is relatively lightly loaded and that better rigidity is achieved than with a symmetrical design. The non-cutting design of the sealing piece in the wall of the throttle valve housing permits precise implementation of the working angle of the sealing edge and also precise implementation of a smooth sealing region, wherein a somewhat greater material load is accepted here than with the flow edge.

The implementation of an opening provided at the outer circumference of the throttle valve with an inclination corresponding to the inclination of the sealing edge is also advantageous, as this also stiffens the throttle valve itself. The inclination of the sealing edge also causes the sealing surface to be enlarged, at least in relation to a vertical sealing edge, i.e., perpendicular to the direction of flow.

It is preferably provided that the smooth sealing region of the sealing edge is inclined by more than 70°, preferably by more than 75° and particularly preferably by about 80° with respect to the flow axis of the throttle valve housing.

Accordingly, the asymmetrical design of the sealing piece provides that the flow edge is inclined less than 50°, preferably less than 40° and particularly preferably about 35° with respect to the flow axis of the throttle valve housing.

The invention also relates to a method for manufacturing a throttle valve housing for a throttle valve arrangement for an internal combustion engine, wherein the throttle valve housing is used to accommodate a pivotally mounted throttle valve and provides movement space for the throttle valve, wherein the throttle valve housing has an inflow opening on a first side for receiving a fluid and the throttle valve housing has an outflow opening on a second side for discharging a fluid, and wherein at least one sealing piece projecting into the flow cross-section is arranged in the movement space of the throttle valve housing and is used as a stop for the throttle valve in the closed position.

In this method, the object described above is achieved by forming a one-piece tubular part in such a manner that the sealing piece in the throttle valve housing is produced by non-cutting forming.

Preferably, the tubular part is formed by pressure from the inside to the outside, so that an outward material flow into an external forming tool is caused, in particular by internal high-pressure forming or by moving a rigid inner tool into a rigid outer tool.

Alternatively, the tubular part is formed by pressure from the outside to the inside so that an inward material flow into an internal forming tool is caused, in particular by external high-pressure forming or by moving a rigid outer tool into a rigid inner tool.

In particular, the method is carried out in such a manner that the objective features of the throttle valve housing described above are achieved.

In detail, there are now numerous possibilities for designing and further developing the throttle valve arrangement and the method for manufacturing such a throttle valve arrangement as will be apparent from the following description of preferred embodiments in conjunction with the accompanying drawings.

DETAILED DESCRIPTION OF THE INVENTION

FIGS. 1 to 5 show throttle valve housings 1 in different degrees of detail and with different centers of gravity. Throttle valve housings together with the throttle valves installed in them form throttle valve housing arrangements; the throttle valves themselves are not shown here, the throttle valve housings 1 are of particular interest.

Throttle valve housing 1 is used to accommodate a pivotally mounted throttle valve and therefore form the movement space for the throttle valve. The throttle valve housing 1 has an inflow opening 2 on a first side for receiving a fluid, and the throttle valve housing 1 has an outflow opening 3 on a second side for discharging the fluid flowing through the throttle valve housing 1; this defines the direction of flow D.

A sealing piece 4 projecting into the flow cross-section is arranged in the movement space of the throttle valve housing 1 and serves as a stop for the throttle valve in the closed position. It is important here that the sealing piece 4 is formed in a non-cutting manner, i.e., shaping without cutting, in the wall of the throttle valve housing 1. In the embodiments shown here, the throttle valve housing 1 and the sealing piece 4 of the throttle valve housing 1 are made of a one-piece tubular part by non-cutting forming. The throttle valve housing 1 shown in the figures is manufactured by internal high pressure forming using a solid, but flexible, forming medium. A polyurethane elastomer has been used as the forming medium. The medium is introduced into the blank of the throttle valve housing 1, compressed axially, i.e. in the direction of flow D, wherein the material escapes radially and presses the wall of the blank into an external tool which is not shown, resulting in the final formed throttle valve housing 1 shown in the figures. Fluid forming media can also be used.

In FIGS. 1, 2 and 4 to 6, it can be seen that the sealing piece 4 is formed in the movement space where the throttle valve closes with the throttle valve housing 1 only in the closed position; the sealing piece 4 is not formed in the area of the shaft opening 5 or around the shaft opening 5. This results in two almost semi-circular sealing piece segments which are disjointed and together form the sealing piece 4.

Figure 1:
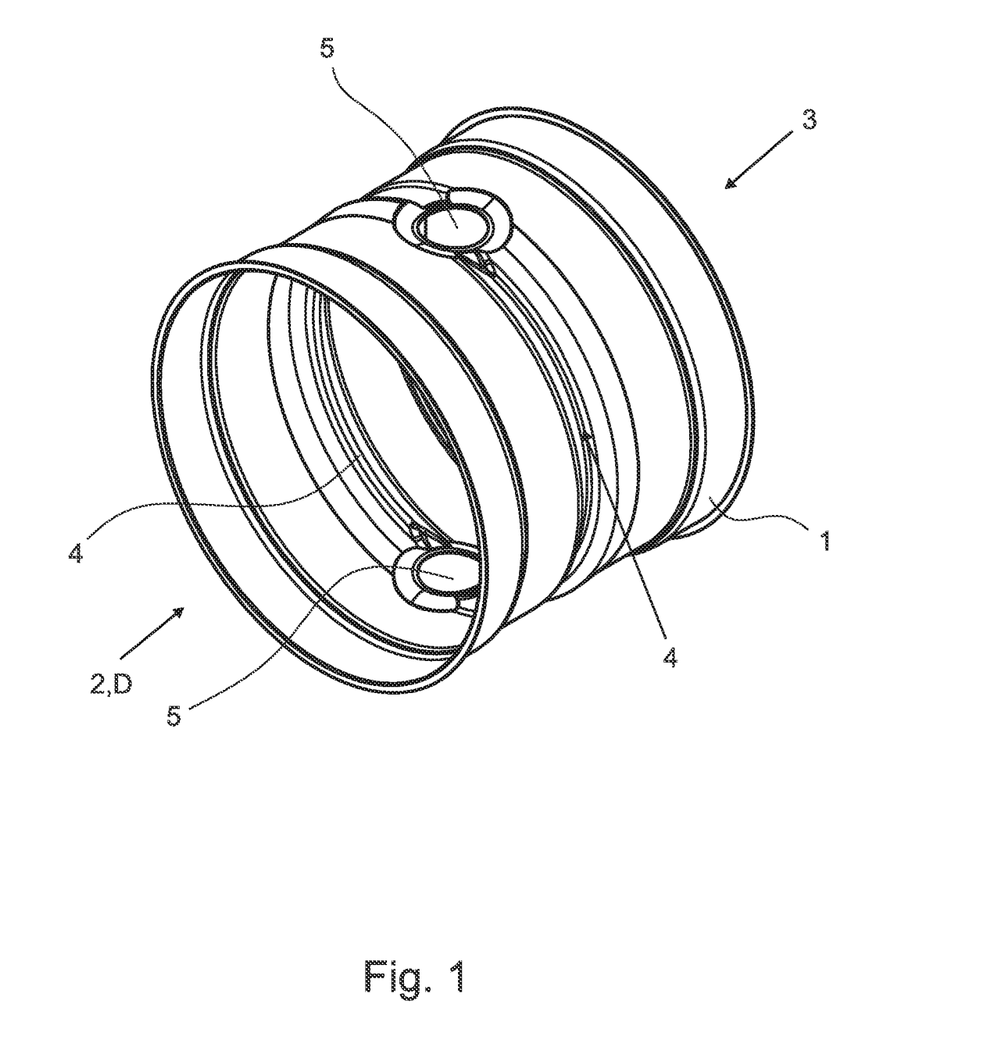
FIG. 1 is a perspective view of a throttle valve housing according to the invention, FIG. 2 an elevational view of the throttle valve housing according to the invention in viewed in a radial direction toward a recess for an actuator shaft and showing a sealing piece profile, FIG. 3 schematically shows the sealing piece profile according to FIG. 2.
Figure 2:
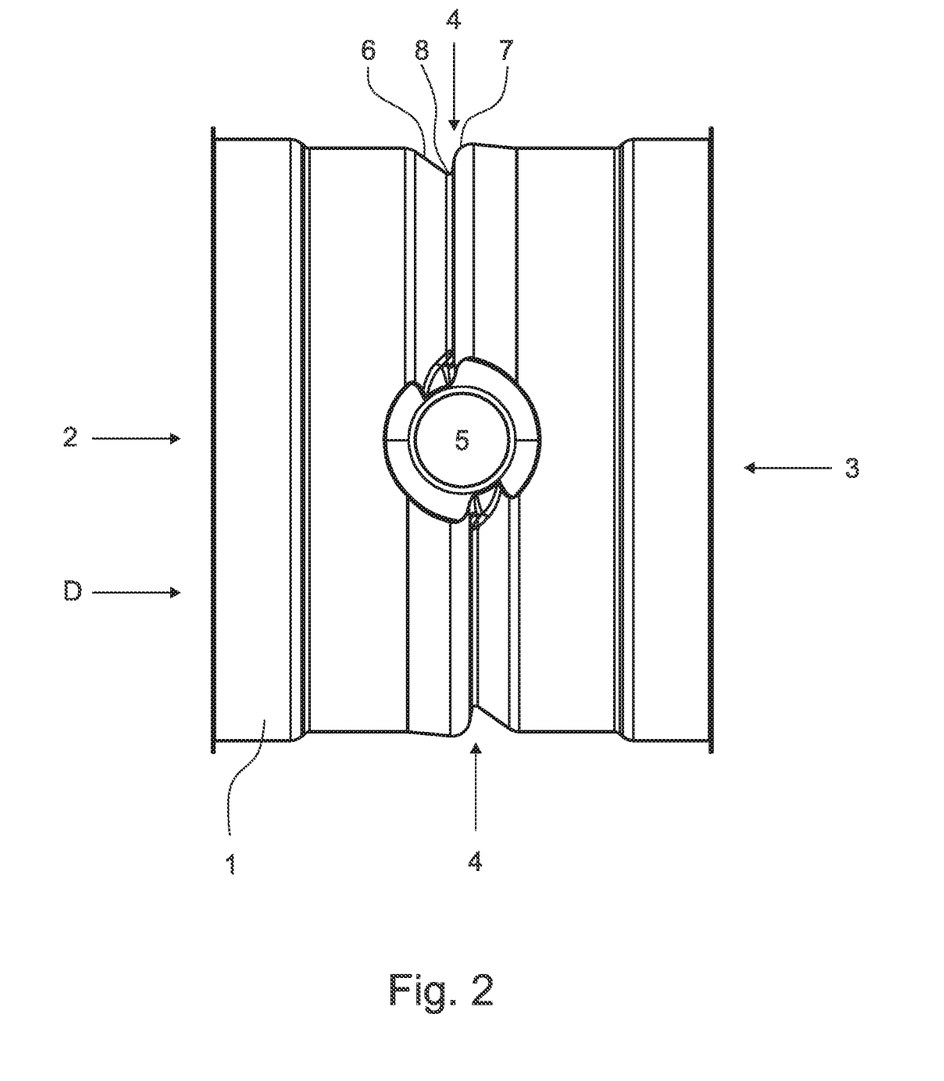
Figure 3:
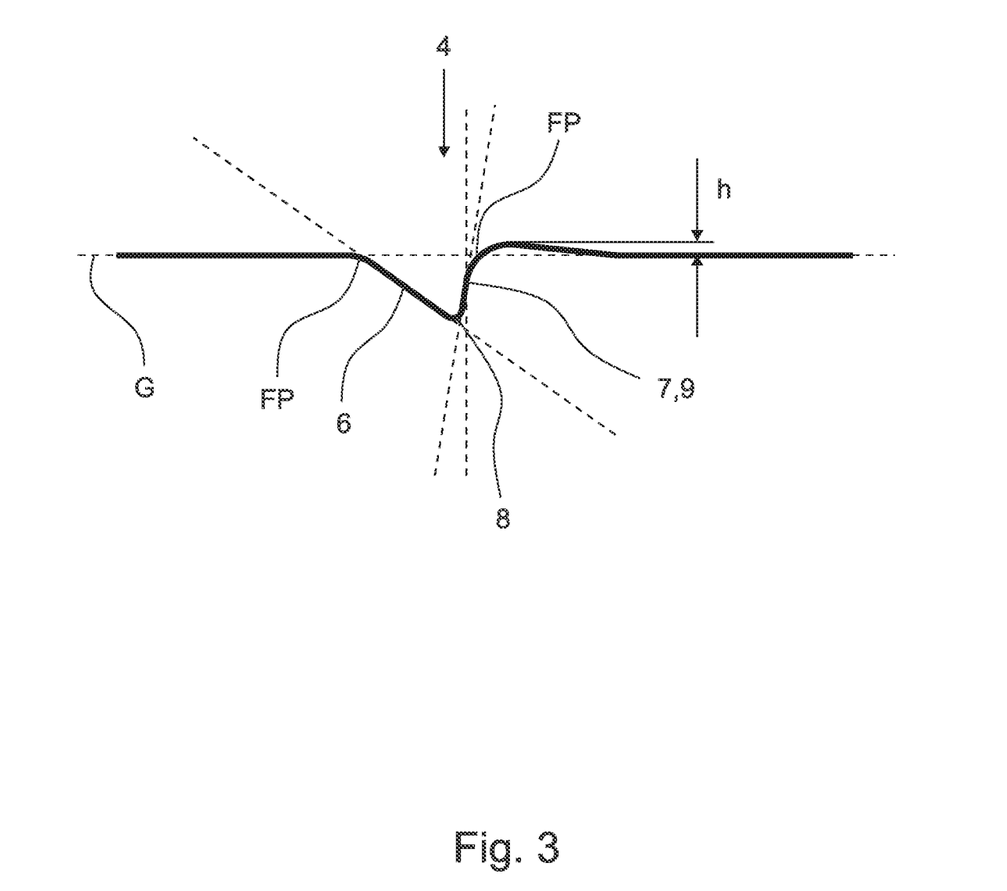
Figure 4:
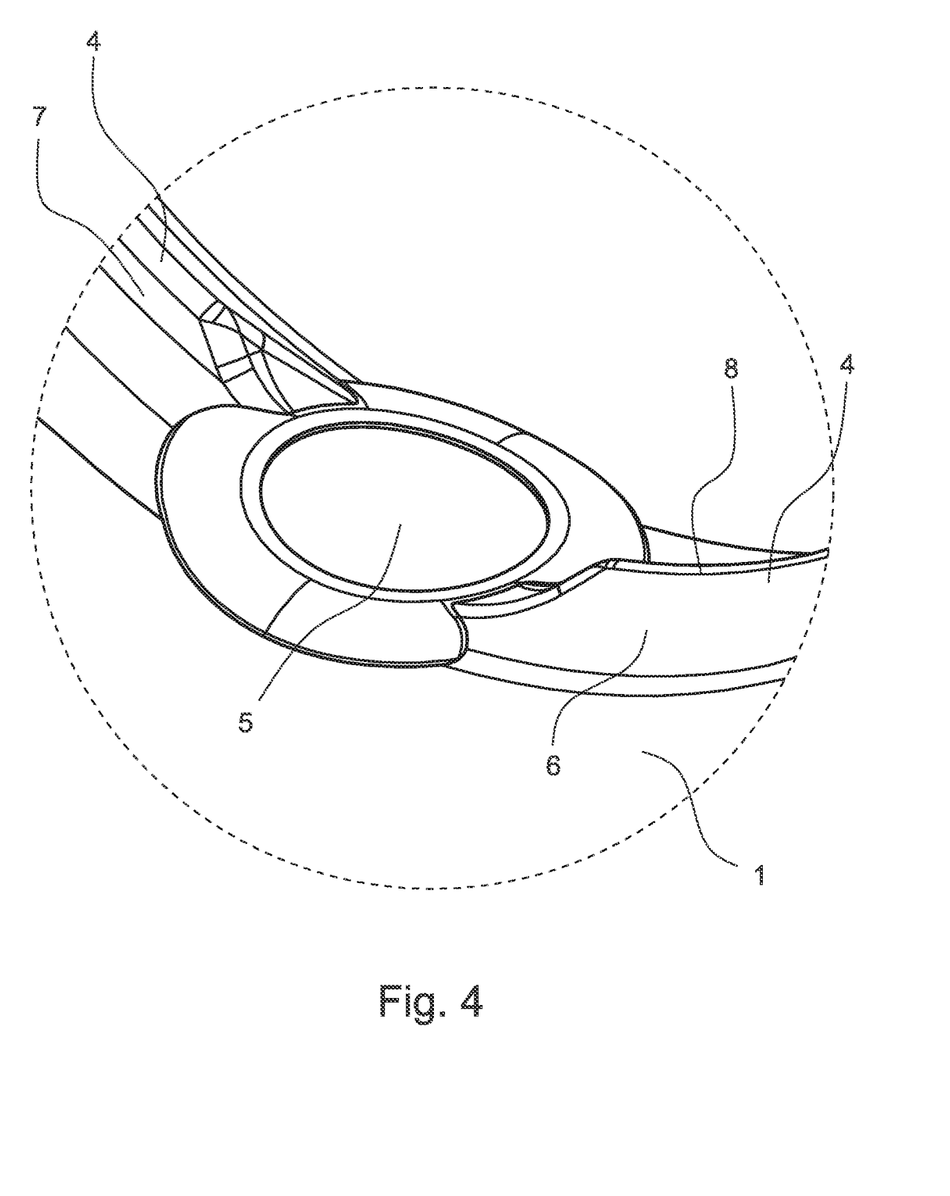
FIG. 4 is a detailed perspective view of the sealing piece in the area of the recess for an actuator shaft.

In FIGS. 2 to 4, in particular in the details of FIG. 3, it is clearly visible that the sealing piece 4 has a triangular profile with a flow edge 6, with a sealing edge 7 and with a tip 8, wherein the flow edge 6 and the sealing edge 7 each originate from a base level G of the throttle valve housing 1 with a base point FP and converge in the tip 8. The base level is formed by the straight course of the wall of the throttle valve housing, from which the contouring of the wall begins through the sealing piece 4. The tip 8 is the element that projects furthest into the flow cross-section. The sealing edge 7 is formed on the side of the sealing piece 4 on which the throttle valve strikes in the closed position.

A smooth sealing region 9 is formed in the sealing edge 7 between its base FP and the tip 8. This is particularly advantageous because a correspondingly smooth counter surface can be formed on the throttle valve without great effort, for example in the form of an applied orifice plate. This results in a significantly better sealing effect than if the sealing piece 4 and the throttle valve were to seal against each other only in a linear contact contour.

The triangular profile of the sealing piece 4 is asymmetrical, with the sealing edge 7 being steeper than the flow edge 6. The smooth sealing region 9 is inclined about 80° with respect to the flow axis or flow direction D or with respect to the base level G of the throttle valve housing 1.

FIG. 3 clearly shows that the sealing edge 7 on the base side extends below the base level of the throttle body 1, i.e., it falls below the base level by the distance h. The formed contour has an arc-shaped path running into the base level G of the throttle body 1. This "falling below" of the contour course means that larger forming radii can be achieved with a smaller material load. In addition, a larger smooth sealing region 9 can also be achieved, since the sealing region 9 is far away from the outlet area of the curved section at the base point FP of the sealing edge 7.

FIG. 3 shows that the flow edge 6 is inclined about 35° with respect to the flow axis D of the throttle valve housing 1 and thus with respect to the base level G of the throttle valve housing 1.

Figure 5:
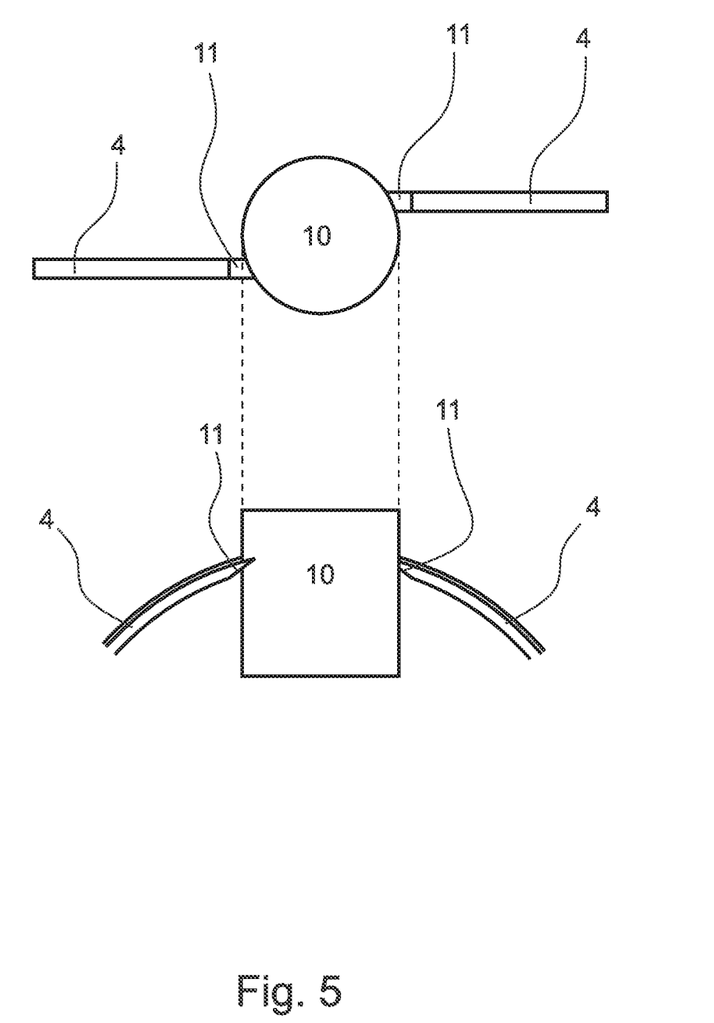
FIG. 5 is a schematic view from two directions of a first implementation of the sealing piece in the area of the recess for an actuator shaft.
Figure 6:
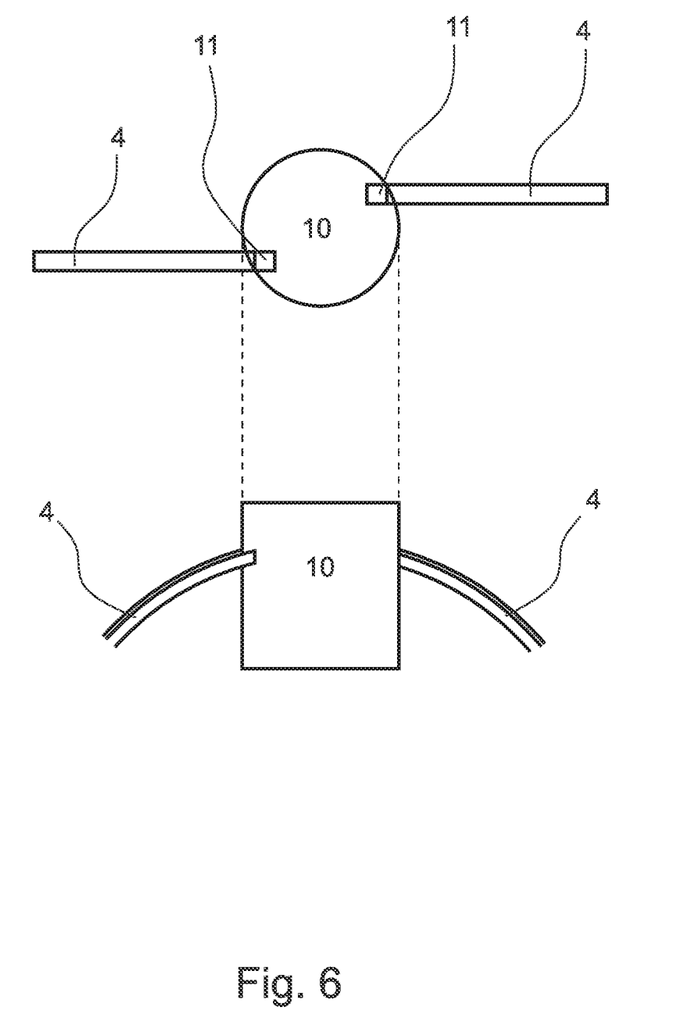
FIG. 6 is a schematic view from two directions of a second, alternative implementation of the sealing piece in the area of the recess for an actuator shaft.

FIGS. 1, 2 and 4 to 6 each show at least one circular opening region 5 as the passage point for an actuator shaft 10; the shaft 10 is only shown schematically in FIGS. 5 and 6. If the throttle valve housing 1 is formed by internal high pressure forming, the only defined opening region 5 is still closed; it is only opened afterwards, here by laser cutting.

In the embodiment shown in the figures, the sealing piece 4 runs off-center towards the opening region 5, wherein the height of the sealing piece 4 slopes downward in a ramp-like manner to the level of the edge of the defined opening region 5. The height of the sealing piece 4 is thus already reduced to zero when the edge of the opening region 5 is reached. The situation shown in perspective in FIG. 4 and is again simplified in FIG. 5, where the shaft 10 has taken the place of the defined opening region 5. This is necessary to be able to recognize the advantages of the described construction. Although the height of the sealing piece 4 slopes downward in a ramp-like manner, i.e. along ramp 11, to the level of the edge of the defined opening region, a sealing ring that is almost closed over the entire circumference is implemented in the direction of flow (FIG. 5 below), also directly on the shaft 10.

An alternative implementation is shown in FIG. 6. Here, too, the sealing piece 4 runs off-center toward the circular opening region 5 as the passage point for the actuator shaft 10, which has taken the place of the opening region 5 in FIG. 6. The height of the sealing piece 4 here remains unchanged up to the edge of the defined opening region 5 or up to the shaft 10. In FIG. 6 above it is indicated that ramp 11 only slopes downward in the area of the potential opening 5, here replaced by the shaft 10. Also in this way, a closed sealing contour can be implemented in the flow direction, but then the edge of the opening 5 is no longer circular.

The invention claimed is:

1. A throttle valve housing for a throttle valve arrangement for an internal combustion engine, comprising:

a body constructed to accommodate a pivotally mounted throttle valve with a movement space for the throttle valve, an inflow opening on a first side of the body for receiving a fluid and an outflow opening on a second side of the body for discharging a fluid, and at least one sealing piece projecting into a flow cross-section of the body in the movement space and forming a stop for the throttle valve in the closed position, wherein the sealing piece is cold-formed in a wall of the body in a non-cutting manner, wherein the sealing piece has a triangular profile with a flow edge, with a sealing edge and with a tip, wherein the flow edge and the sealing edge each originate from a base level of the body with a base point and converge at the tip, wherein the tip projects furthest into the flow cross-section and wherein the sealing edge is formed on a side of the sealing piece that forms said stop for the throttle valve in the closed position, wherein the triangular profile of the sealing piece is asymmetrical, wherein the sealing edge on a base side extends beyond the base level of the throttle valve housing.

2. The throttle valve housing according to claim 1, wherein the body and the sealing piece are formed of a one-piece tubular part by shaping without cutting.

3. The throttle valve housing according to claim 1, wherein the sealing piece is at a location which contacts the throttle valve only in a closed position of the throttle valve.

4. The throttle valve housing according to claim 1, wherein a smooth sealing region is formed in the sealing edge between its base point and the tip.

5. The throttle valve housing according to claim 1, wherein the sealing edge being steeper than the flow edge, wherein the smooth sealing region is inclined more than 70° relative to the flow axis or the base level line of the throttle valve housing.

6. The throttle valve housing according to claim 1, wherein the flow edge inclined less than 50° relative to the flow axis or the base level.

7. The throttle valve housing according to claim 1, wherein at least one circular opening region is provided for an actuator shaft of the throttle valve, wherein the sealing piece runs off-center towards the opening region, wherein the sealing piece slopes downward in a ramp-shaped manner to the level of an edge of the opening region.

8. The throttle valve housing according to claim 1, wherein at least one circular opening region is provided as a passage point for an actuator shaft of the throttle valve, wherein the sealing piece runs off-center towards the opening region, wherein the height of the sealing piece remains unchanged up to the edge of the opening region, and the height of the sealing piece only then slopes downward in a ramp-shaped manner.

9. A method for producing a throttle valve housing for a throttle valve arrangement for an internal combustion engine, wherein the throttle valve housing has a body that accommodates a pivotally mounted throttle valve and provides movement space for the throttle valve, wherein the body has an inflow opening on a first side for receiving a fluid and an outflow opening on a second side for discharging the fluid, and wherein at least one sealing piece is arranged in the movement space projecting into a flow cross-section of the body and forms a stop for the throttle valve in the closed position, wherein the sealing piece has a triangular profile with a flow edge, with a sealing edge and with a tip, wherein the flow edge and the sealing edge each originate from a base level of the body with a base point and converge at the tip, wherein the tip projects furthest into the flow cross-section and wherein the sealing edge is formed on a side of the sealing piece that forms said stop for the throttle valve in the closed position, wherein the triangular profile of the sealing piece is asymmetrical, wherein the sealing edge on a base side extends beyond the base level of the throttle valve housing, the method comprising:

forming the body from as a one-piece tubular part with the sealing piece by shaping in a non-cutting manner, wherein the shaping in a non-cutting manner comprises cold-forming the body in one-piece with the seal from the inside to the outside using pressure forming, so that an outward material flow into an external forming tool is produced.

* * * * *